United States Patent [19]
Decker

[11] Patent Number: 4,464,138
[45] Date of Patent: Aug. 7, 1984

[54] FLEXIBLE COUPLINGS

[75] Inventor: Robert W. Decker, Stewartsville, N.J.

[73] Assignee: Sier-Bath Gear Company, Inc., North Bergen, N.J.

[21] Appl. No.: 420,122

[22] Filed: Sep. 20, 1982

[51] Int. Cl.³ .............................................. F16D 3/50
[52] U.S. Cl. ...................................... 464/56; 464/82; 464/147
[58] Field of Search .................... 464/55, 56, 69, 82, 464/106, 147

[56] References Cited

U.S. PATENT DOCUMENTS

| | | | |
|---|---|---|---|
| 1,620,592 | 3/1927 | Briscoe | 464/56 |
| 2,821,071 | 1/1958 | Tetlow | 464/82 X |
| 3,286,488 | 11/1966 | Anderson, Sr. et al. | 464/56 |

FOREIGN PATENT DOCUMENTS

| | | | |
|---|---|---|---|
| 2943921 | 5/1981 | Fed. Rep. of Germany | 464/55 |
| 3027060 | 2/1982 | Fed. Rep. of Germany | 464/55 |
| 310447 | 5/1929 | United Kingdom | 464/69 |

Primary Examiner—Stuart S. Levy
Assistant Examiner—Daniel P. Stodola
Attorney, Agent, or Firm—F. S. Troidl

[57] ABSTRACT

A pair of rotatable members, one having a greater inside diameter than the outside diameter of the other are interconnected by flexible members extending tangentially to the first rotatable member from one location on the second rotatable member to a second location on the second rotatable member circumferentially spaced from the first location.

The first rotatable member has a plurality of grooves for changing the axial location of each flexible member.

5 Claims, 6 Drawing Figures

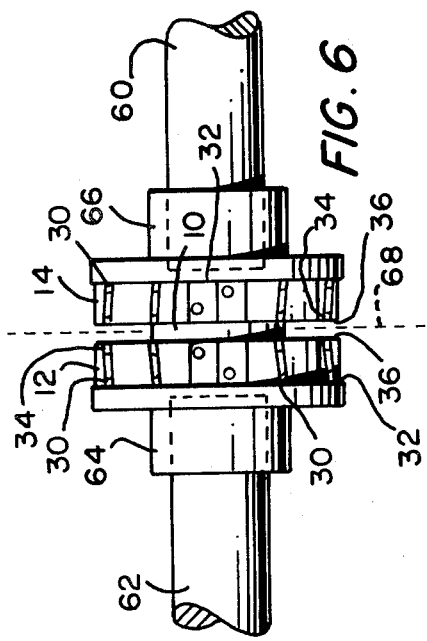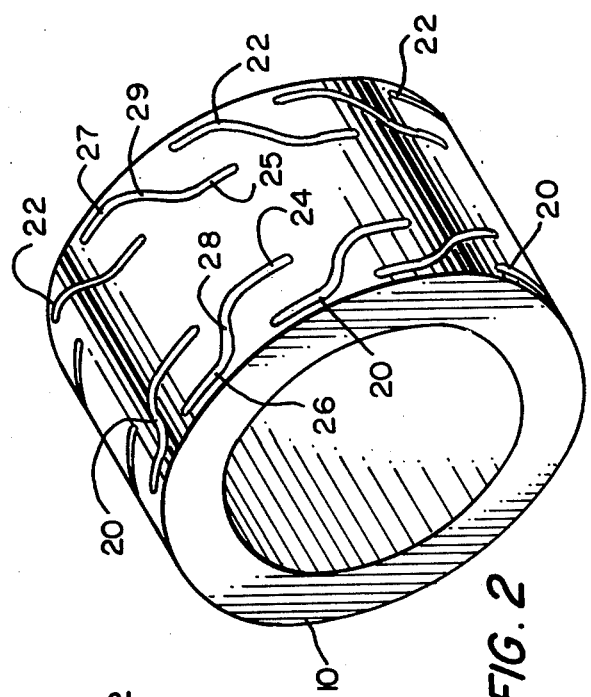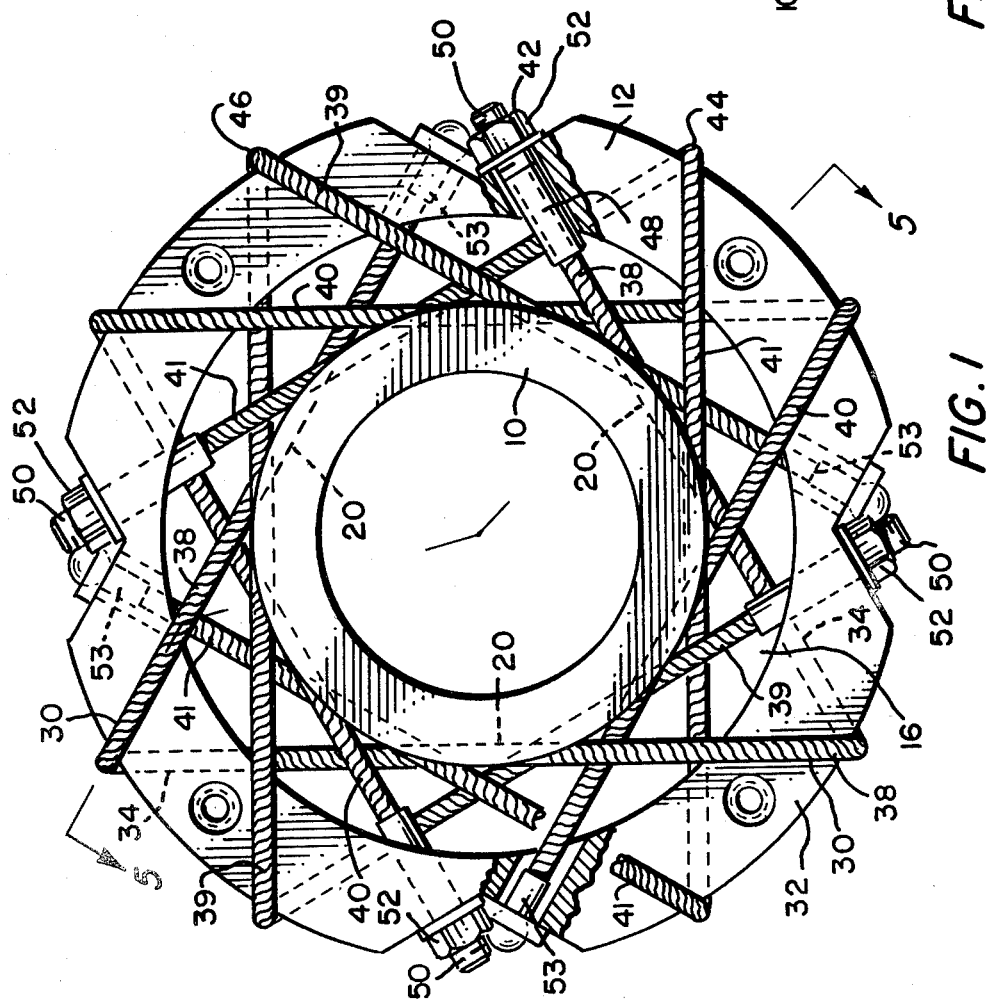

FLEXIBLE COUPLINGS

This invention relates to couplings. More particularly, this invention is a new flexible coupling or flexible connection between rotating members, such as rotating shafts, and having high torque transmitting capabilities.

There are currently two types of flexible couplings in general use which do not require lubrication or other maintenance. The Thomas type which uses a stack of punched shim stock elements to transmit torque while being flexible in bending and in the axial direction and the Bendix type which uses a precision thin diaphragm to perform the same functions. The torque carrying capacity of the Thomas type is severely limited as is its maximum rotating speed. The Bendix type, normally restricted to high performance applications, is dependent upon a precision machined high strength diaphragm which must be carefully protected from corrosive influences.

Flexible couplings utilizing flexible members such as wire cables have been proposed before. For example, some flexible couplings of this type are disclosed in U.S. Pat. No. 3,286,488 patented Nov. 22, 1966 entitled "Flexible Coupling and Hub Mountings."

The invention to be described herein is an improved flexible coupling utilizing flexible members such as cables for transmitting torque.

Briefly described the flexible coupling includes a first rotatable member and a second rotatable member having at least a portion of greater inside diameter than the outside diameter of the first rotatable member to provide an annular space between the two rotatable members. The first rotatable member has flexible member positioning means constructed to change the axial location of a flexible member extending tangentially to the first rotatable member between two circumferentially spaced locations on the second rotatable member. Flexible members extend tangentially to the first rotatable member between two circumferentially spaced locations on the second rotatable member. These flexible members each extend tangentially from the second rotatable member to the flexible member positioning means along one plane and then to the second rotatable member along a different plane spaced axially from the first plane.

The invention as well as its may advantages may be further understood with reference to the following detailed description and drawing of which:

FIG. 1 is a front view of a preferred embodiment of the invention;

FIG. 2 is a perspective view of the cylinder of the embodiment of FIG. 1;

FIG. 6 shows the flexible coupling interconnecting two shafts with the cables removed for clarity.

In the various figures like parts are referred to by like numbers.

Figure 4:
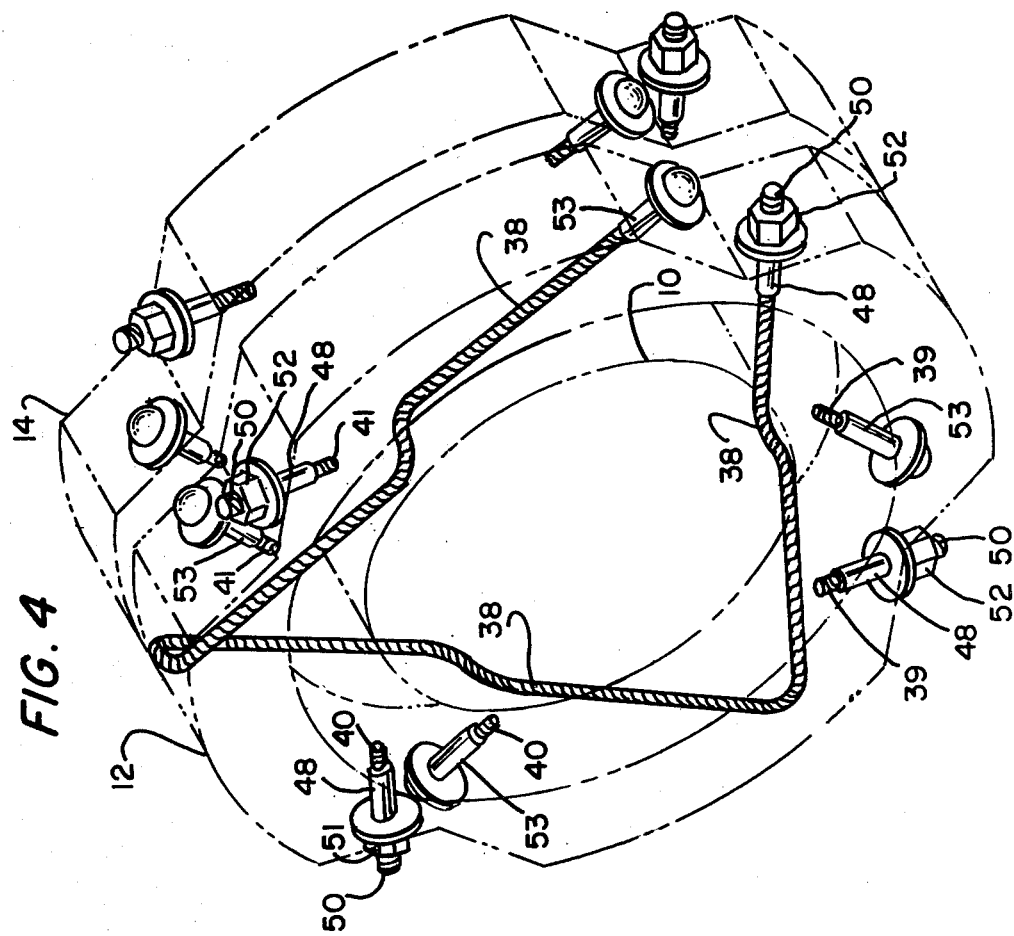
FIG. 4 is a perspective view showing the annular members in phantom and useful in explaining the manner in which the cables are wrapped around the annular members.
Figure 5:
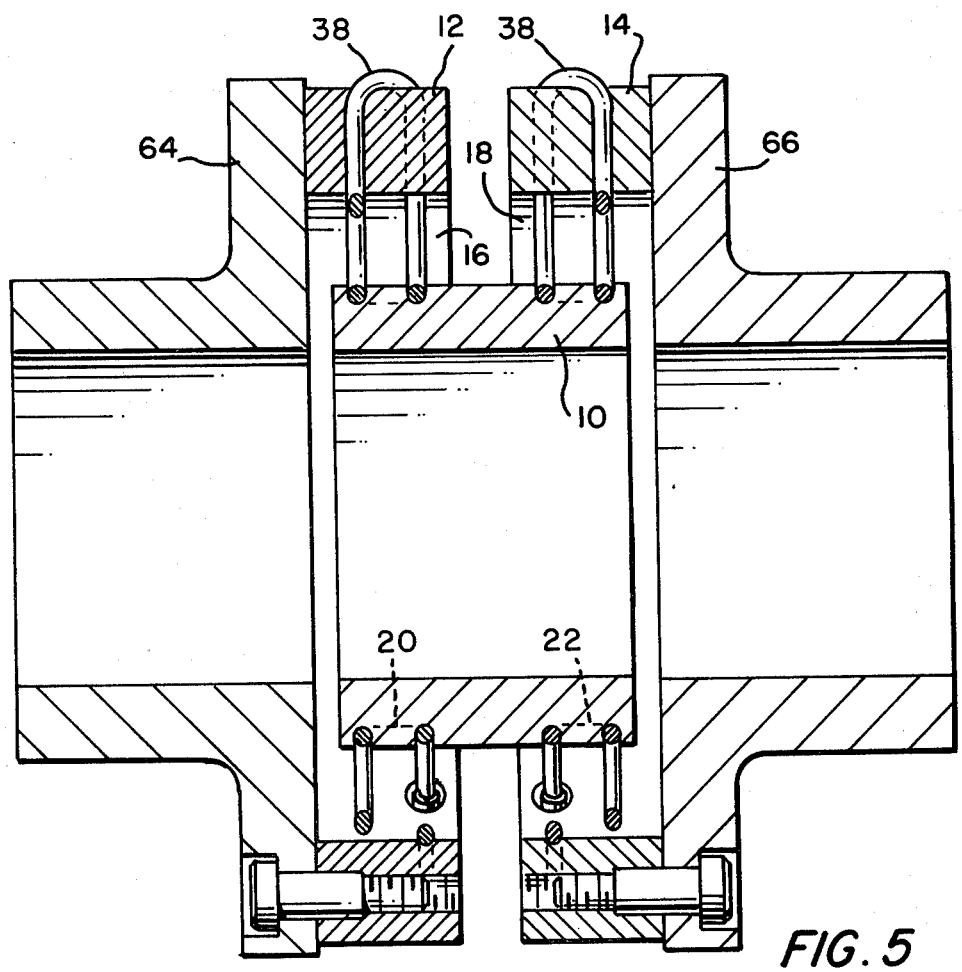
FIG. 5 shows the flexible coupling used to interconnect two flanges with the flexible coupling shown as a sectional view taken along lines 5—5 of FIG. 1 and in the direction of the arrows.

Referring to the drawings and more particularly to FIG. 1 the flexible coupling includes a cylinder 10 and a pair of axially spaced annular members 12 and 14 (see FIG. 4). As may be seen in FIG. 5 the annular members, each have at least a portion radially spaced from and overlapping the cylinder 10 to provide axially spaced annular spaces 16 and 18 between the cylinder 10 and annular members 12 and 14, respectively.

The rotatable cylinder 10 as shown in FIG. 2 has two sets of axially spaced grooves 20 and 22 formed around the outside periphery. Each groove 20 includes axially separated straingt portions 24 and 26 parallel to the ends of cylinder 10. Portions 24 and 26 are interconnected by a slated S-shaped portion 28. Each groove 22 includes axially separated straight portions 25 and 27 parallel to the ends of cylinder 10. Portions 25 and 27 are interconnected by a slated S-shaped portion 29. S-shaped portions 28 and 29 slant in different directions so that straingt portions 26 and 27 which are closer to the ends of cylinder 10 than straight portions 24 and 25 are axially aligned, and straight portions 24 and 25 are axially aligned.

Figure 3:
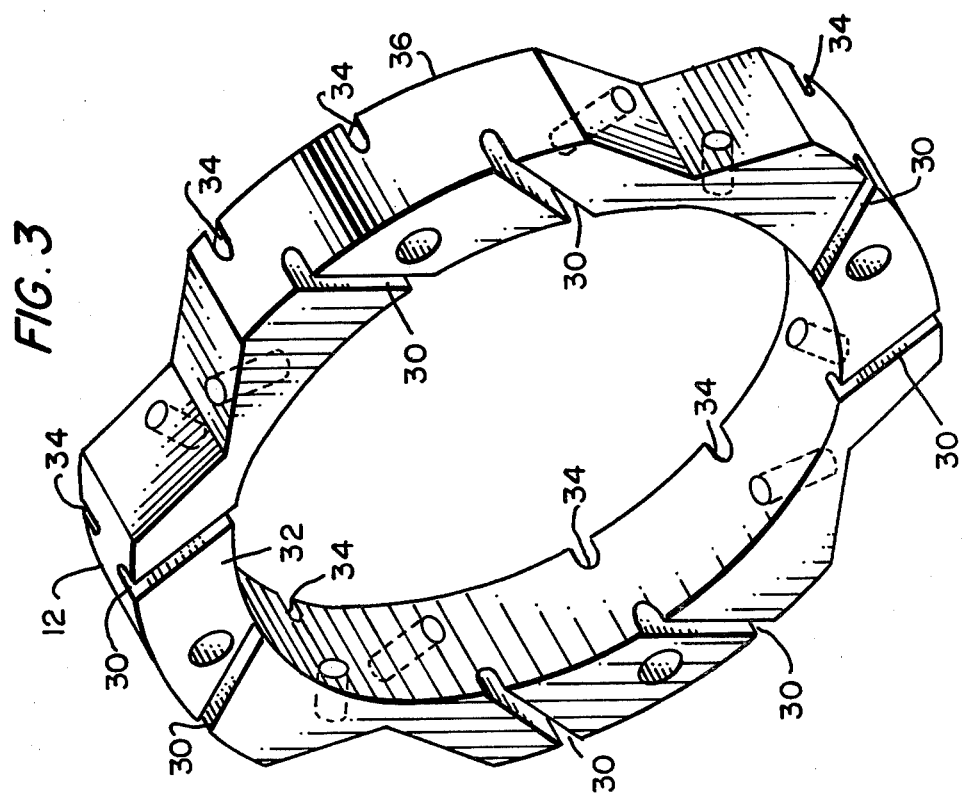
FIG. 3 is a perspective view of one of the annular members of the embodiment of FIG. 1.

As can be seen from FIG. 3 each annular member such as annular member 12 has circumferentially spaced grooves 30 on the radial surface 32. Circumferentially spaced grooves 34 are provided on the other radial surface (not shown). The grooves extend entirely across the radial surfaces and are shaped to receive cables extending tangentially from cylinder 10.

A plurality of flexible members such as cables 38, 39, 40, and 41 transmit torque between the cylinder 10 and the annular member 12 (see FIG. 1). Each cable is in the general shape of an equilateral triangle with the points of each equilateral triangle being spaced from corresponding points of adjacent equilateral triangles a circumferential angle of approximately 30°. For example, the point 42 of cable 38 is circumferentially spaced about 30° from points 44 and 46 of the adjacent cables 41 and 39, respectively.

One end of each flexible cable is connected to the annular member 12 by a sleeve 48 extending through a bore in the annular member 12. The sleeve 48 is provided at its outer end with threads 50 so that the sleeve 48 may be bolted to the annular member 12 by means of nut 52. The end of the cable may be connected firmly to the sleeve 48 by swaging or other means. The other end of each of the cables is connected to annular member 12 through sleeve 53 by swaging or other means.

Following the path of cable 38 from one end to the other end and looking at FIG. 1, FIG. 3, and FIG. 4, cable 38 has one end connected to the annular member 12 by the sleeve 48. The cable extends tangentially to a groove 20 in the cylinder 10. The cable then progresses through the groove 20 and at the S section 28 is moved axially and then extends tangentially to a groove 34 in a radial surface 36 of the annular member 12. Cable 38 is then wrapped around the outside of the annular member 12 and extends tangentially through a groove 30 on radial surface 32 of the annular member. The cable 38 continues tangentially to a second groove 20 on the cylinder 10 when it is again changed to a different axial location and then tangentially from the second groove 20 through a groove 34 on the first radial side 36 of annular member 12. Thereafter, the cable 38 is wrapped around the outside of the annular member 12, extends tangentially through a groove 30 on radial surface 32 of the annular member to a third groove 20 on the cylinder 10 where it is again changed to a different axial location and extends tangentially from the third groove 20 on cylinder 10 back to the annular member 12. The end of the flexible member 38 is at sleeve 53 and it is substantially the same circumferential position on the annular member 12 as the beginning of the flexible cable 38.

As shown in FIG. 6 this new flexible coupling may be used to drive a shaft 60 by driving shaft 62. For clarity the cables are not shown in FIG. 6. The annular member 12 is connected to a flange 64 which in turn is connected to shaft 62. The annular member 14 is connected to flange 66 which in turn is connected to shaft 60. The same number of cables, wrapped in the same way as the cables are wrapped about annular member 12 and cylinder 10, are wrapped about annular member 14 and cylinder 10 except that the four cables interconnecting the cylinder 10 and annular member 14 form a mirror image of the cables interconnecting the cylinder 10 and the annular member 12 if one considers the mirror as being along the imaginary plane 68. With this arrangement the shaft 62 may be rotated in either rotational direction and the shaft 60 will be rotated in the same rotational direction as the shaft 62.

Though it is desired that the shafts 60 and 62 be in alignment with the axes of the shafts in the same straight line, in paractice it is very difficult to keep the shafts aligned. This flexible coupling permits parallel offset misalignment which means the axes of the connected shafts are parallel but not in the same straight line. The coupling also allows symmetrical or non-symmetrical angular misalignment where the axes of the shafts intersect but the axes are not in the same straight line.

Instead of cables, the flexible members can be rods, wire, or wire rope. The flexible members are required to transmit tension forces only and are characterized by a very high slenderness ratio. As a consequence, a relatively high degree of bending can be tolerated with little resistance and low fiber stress. Hence, the element can transmit torque with a high stiffness coefficient, while at the same time being relatively flexible in shaft axial bending.

This characteristic is highly desirable in a flexible shaft coupling. Since any relative motion is taken in the metal fibers, lubrication is neither necessary nor required.

I claim:

1. A flexible coupling comprising: a first rotatable member; a pair of axially spaced coaxial outer rotatable members, each outer rotatable member having at least a portion thereof of greater inside diameter than the outside diameter of the first rotatable member thereby providing an annular space between the pair of outer rotatable members and the first rotatable member, the first rotatable member having a plurality of grooves on its outside periphery adapted to change the axial location of cables extending tangentially to the first rotatable member between two circumferentially spaced locations on each outer rotatable member, each cable having one end connected to a second rotatable member and extending from the second rotatable member to a groove in the first rotatable member, then from said groove to the second rotatable member where it is wrapped around the second rotatable member, then from the second rotatable member back to a second groove in the first rotatable member, then from the first rotatable member back to the second rotatable member where it is wrapped around said rotatable member, then from said second rotatable member to a third groove in the first rotatable member, and then from the first rotatable member to the second rotatable member where the other end of the flexible cable is connected to the second rotatable member, the two ends of the flexible cable being at substantially the same circumferential location on the second rotatable member.

2. A flexible coupling in accordance with claim 1 wherein: each cable is generally in the shape of an equilateral triangle.

3. A flexible coupling in accordance with claim 2 wherein: there are four cables in the general shape of an equilateral triangle with the points of each equilateral triangle being spaced from corresponding points of adjacent equilateral triangles a circumferential angle of approximately 30°.

4. A flexible coupling comprising: a cylinder; a pair of axially spaced coaxial annular members, each annular member having at least a portion thereof radially spaced from and overlapping the cylinder to provide annular spaces between the cylinder and each annular member; a coaxial shaft connected to each annular member; the cylinder having two sets of grooves, each set extending around the outer periphery of the cylinder, said grooves each being shaped to change the axial location of a flexible member extending tangentially to the cylinder between two circumferentially spaced locations on said annular member; each annular member having circumferentially spaced grooves on each radial surface adapted to receive flexible members extending tangentially from the cylinder; one set of four flexible members in the general shape of an equilateral triangle interconnecting the cylinder and one annular member, and a second set of four flexible members in the general shape of an equilateral triangle interconnecting the cylinder and the other annular member with the points of each equilateral triangle in a set being spaced from corresponding points of adjacent equilateral triangles a circumferential angle of approximately 30°, each flexible member having one end connected to an annular member and extending tangentially from the annular member to a groove in the cylinder, then extending tangentially from the cylinder groove through a groove in one radial surface of the annular member, is wrapped around the outside of the annular member, then extends tangentially through a groove on the other radial surface of the annular member tangentially to a second groove on the cylinder, then extending tangentially from said second cylinder groove through a second groove in said one radial surface of the annular member, is wrapped around the outside of the annular member, then extends tangentially through a groove on the said other radial surface of the annular member tangentially to a third groove on the cylinder, then extending tangentially from the third cylinder groove to the annular member to end the flexible member at a circumferential position on the annular member substantially the same as the beginning of the flexible member.

5. A flexible coupling in accordance with claim 4 wherein: the sets of four flexible members interconnecting the cylinder and the annular members are mirror images of one another.

* * * * *